July 11, 1967 J. A. INDERHEES 3,330,944
AIR TRAFFIC CONTROL SYSTEM INCLUDING MEANS FOR GENERATING
AND DISPLAYING THE PREDICTED FLIGHT PATH
OF A PLURALITY OF AIRCRAFT
Filed May 31, 1963 8 Sheets-Sheet 1

INVENTOR.
JOHN A. INDERHEES
ATTORNEYS.

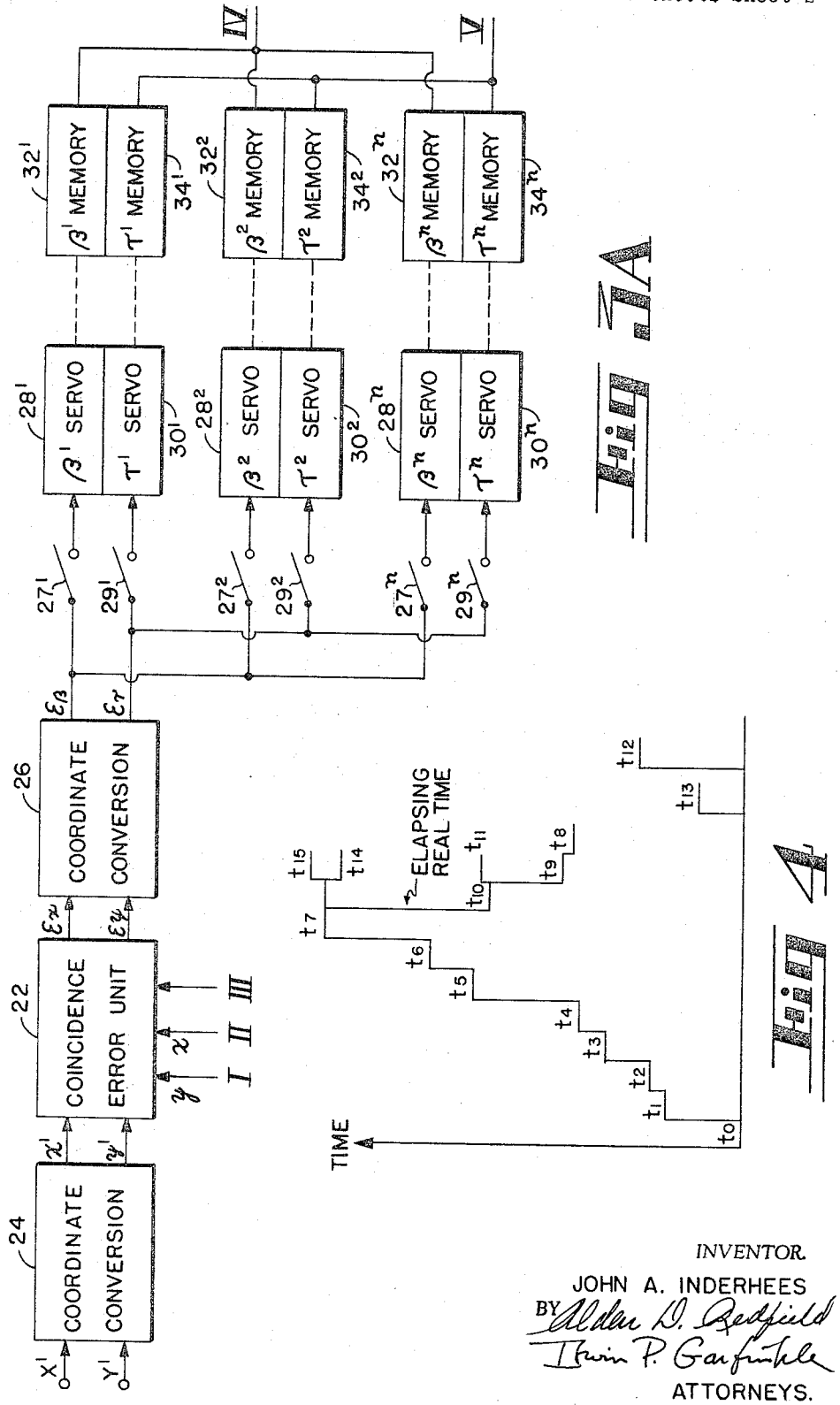

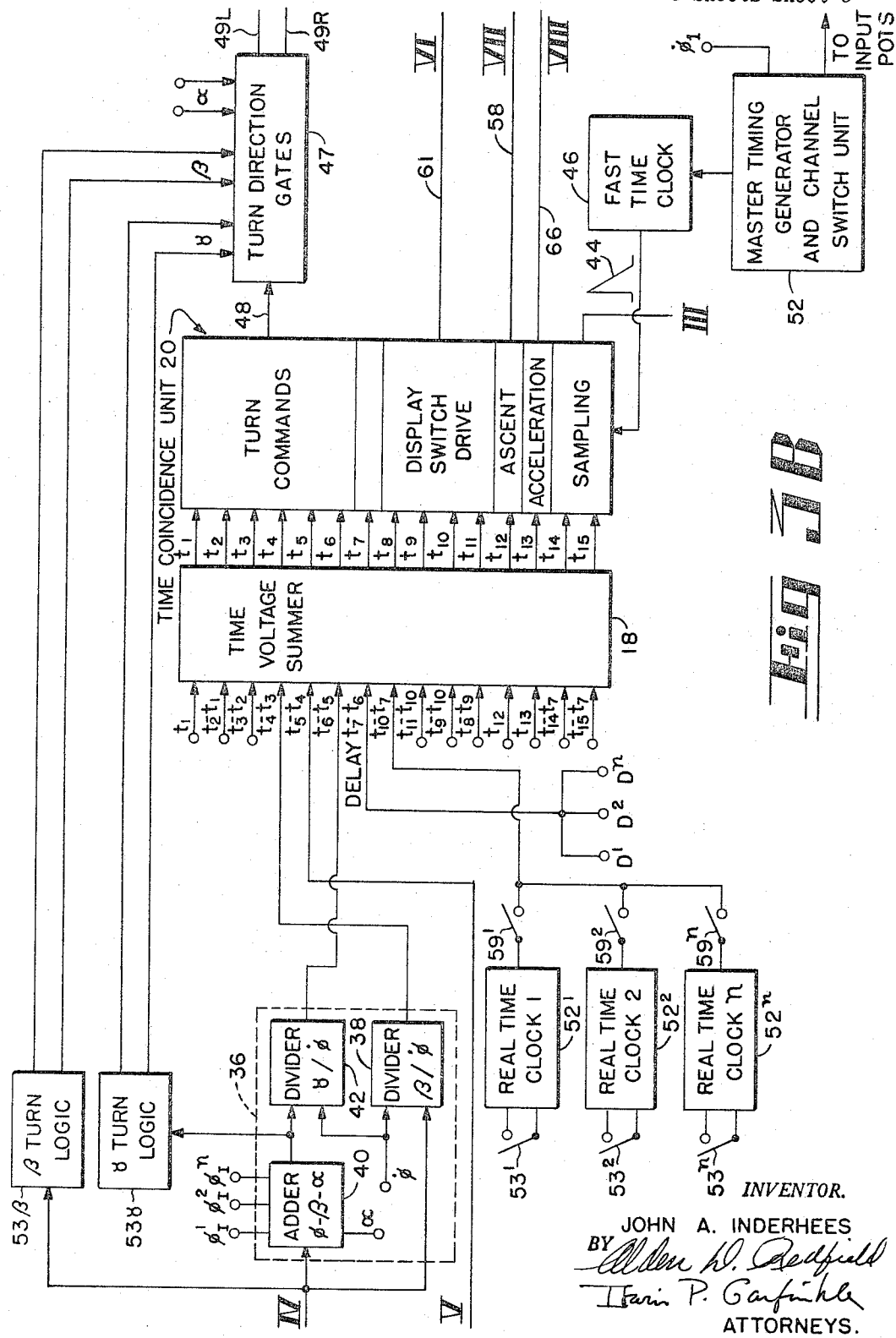

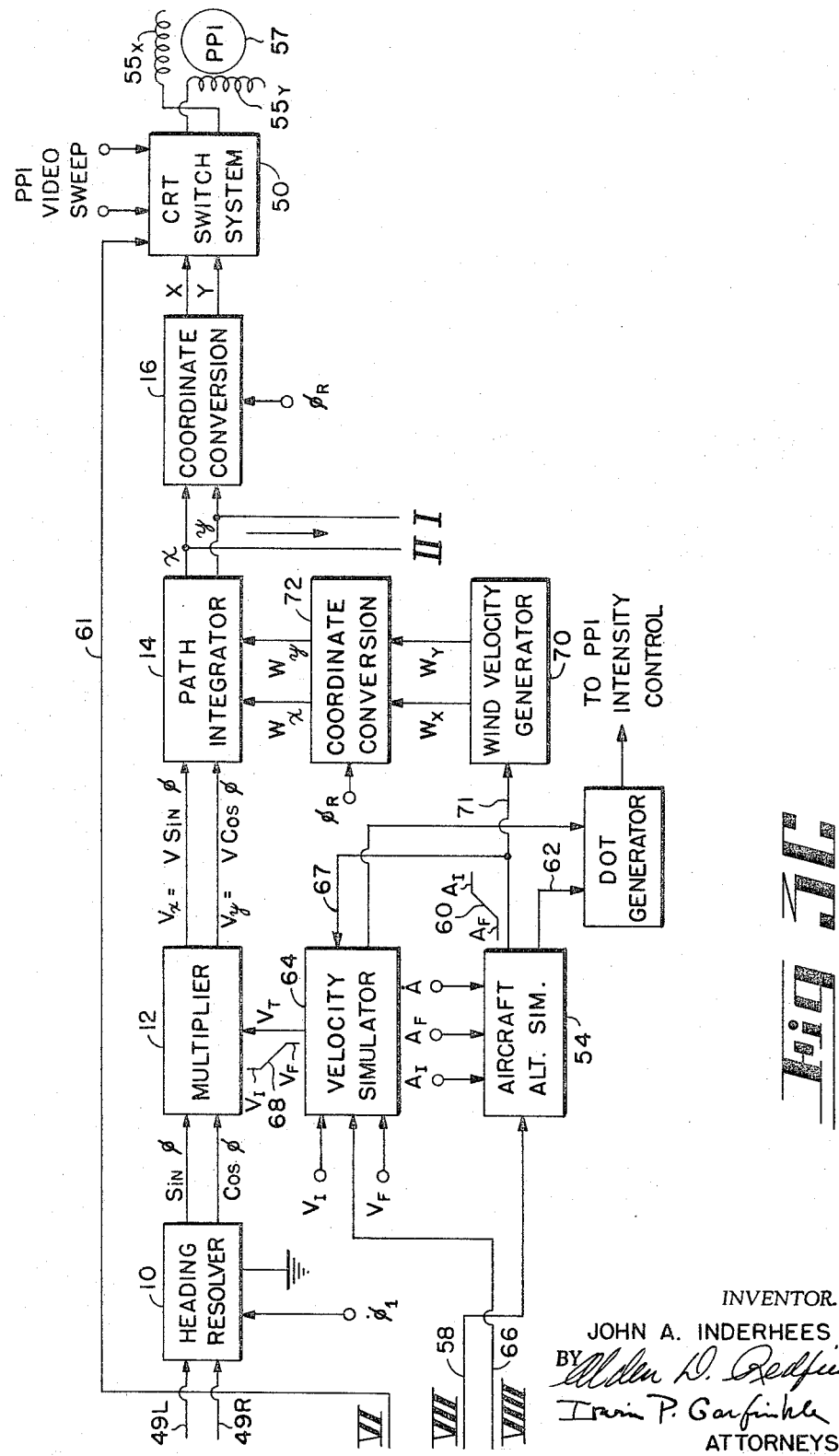

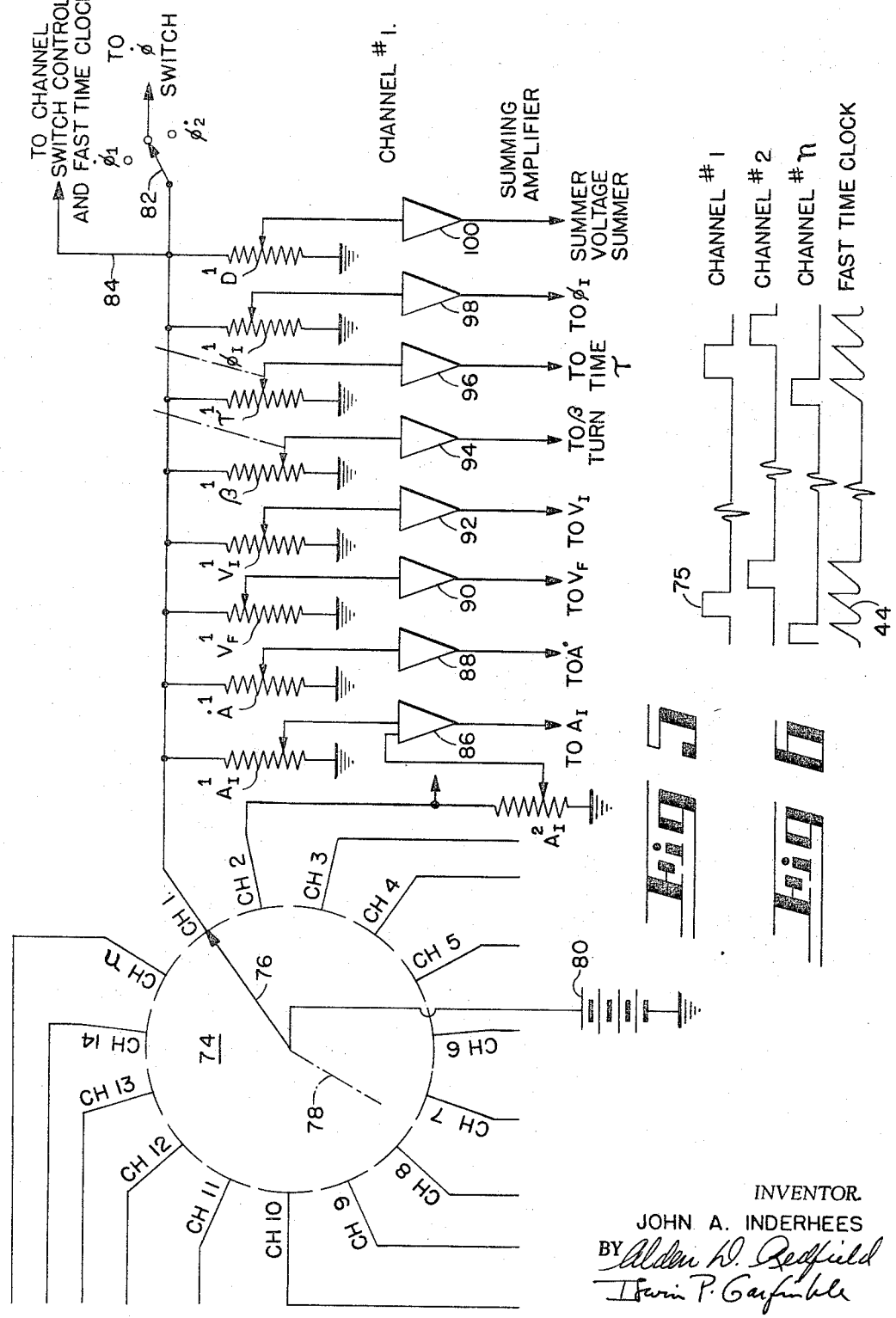

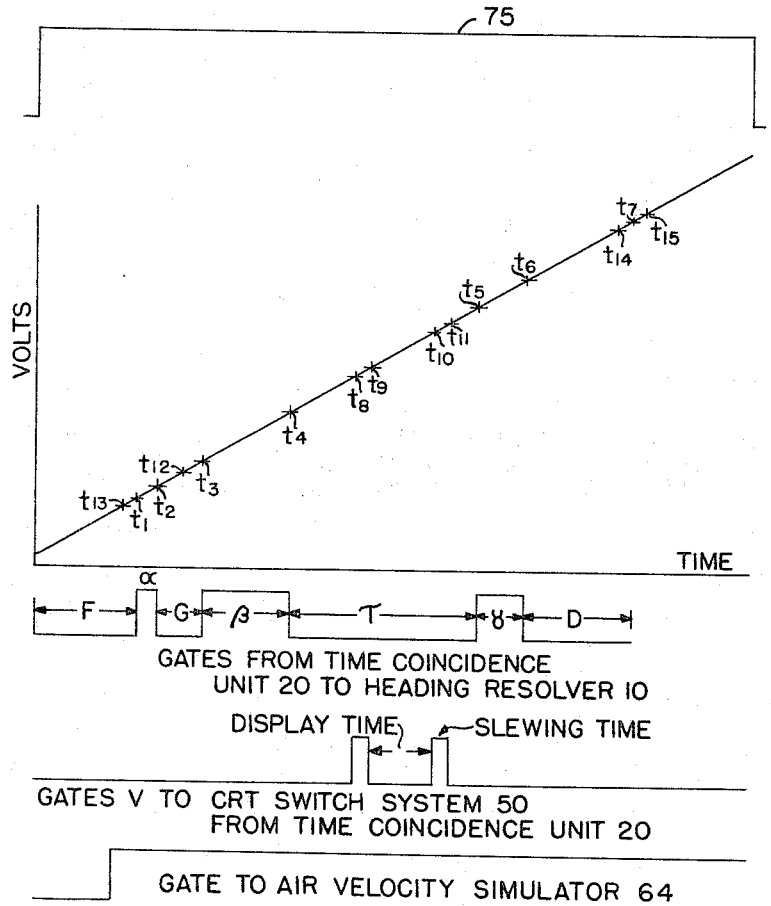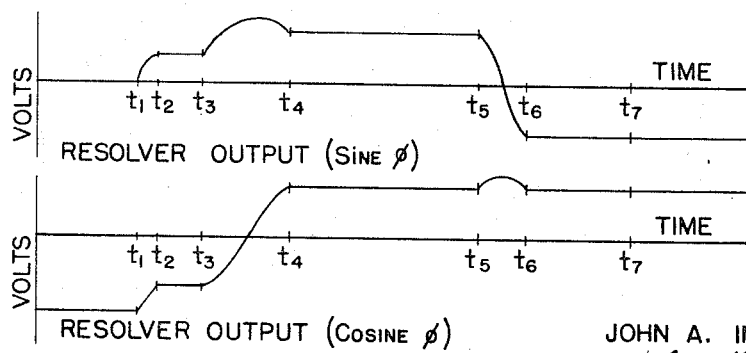
Fig. 7

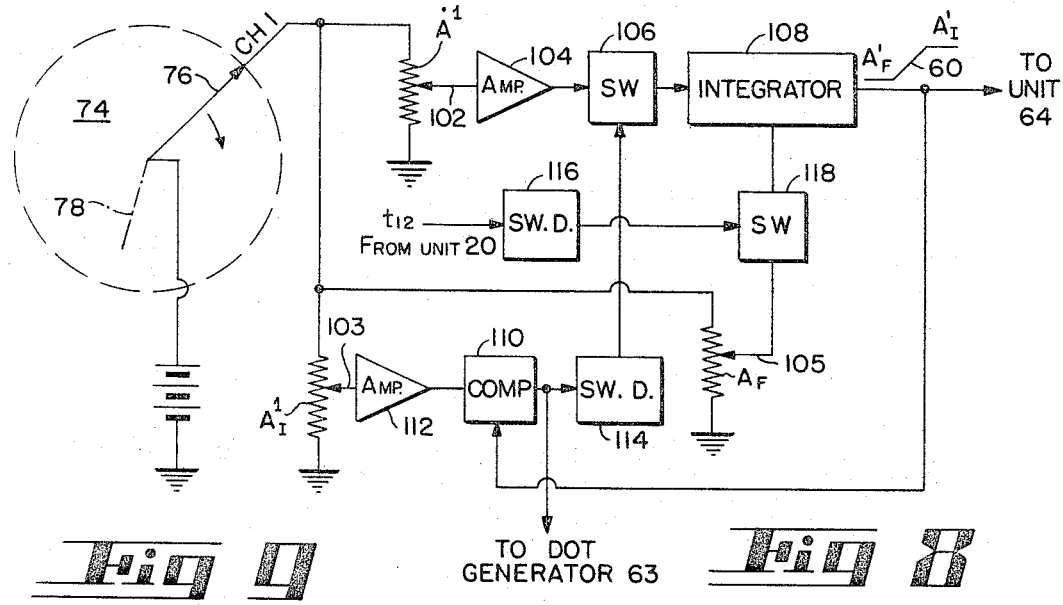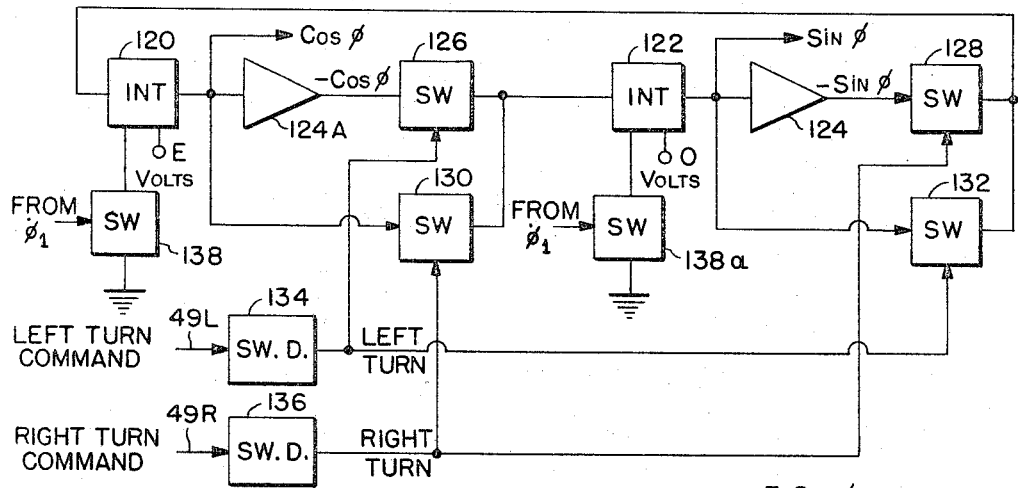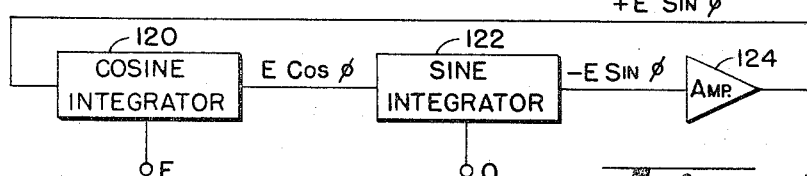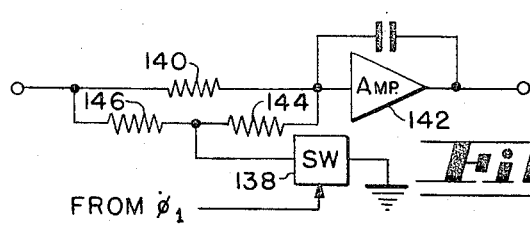

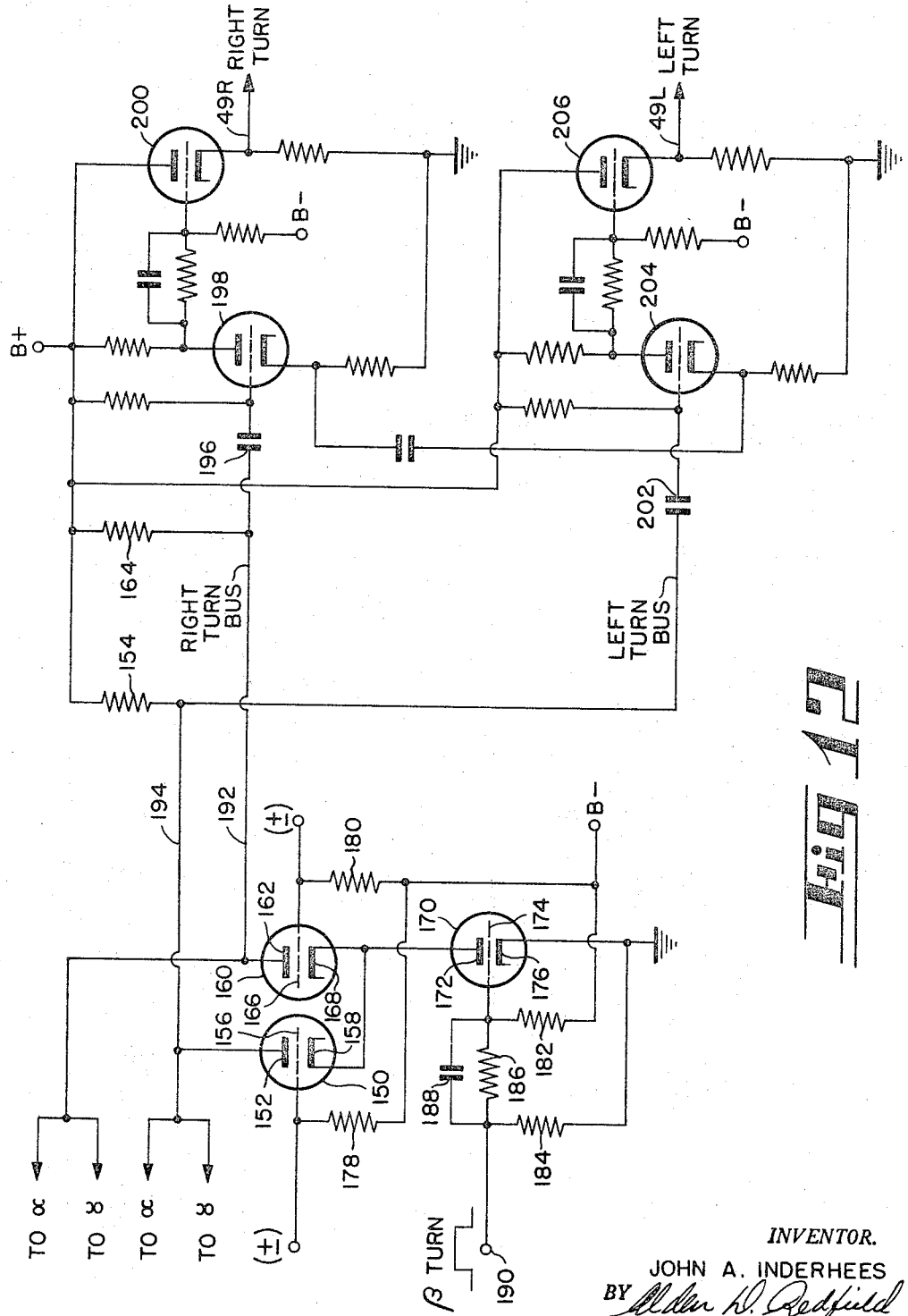

United States Patent Office 3,330,944
Patented July 11, 1967

3,330,944
AIR TRAFFIC CONTROL SYSTEM INCLUDING MEANS FOR GENERATING AND DISPLAYING THE PREDICTED FLIGHT PATH OF A PLURALITY OF AIRCRAFT
John A. Inderhees, Cincinnati, Ohio, assignor to Avco Corporation, Cincinnati, Ohio, a corporation of Delaware
Filed May 31, 1963, Ser. No. 284,436
30 Claims. (Cl. 235—150.23)

This invention relates to a flight path prediction and display system, and more particularly to an air traffic control system in which the flight paths of a plurality of aircraft from present position to touchdown are predicted and displayed for aiding in the vectoring of aircraft.

The primary purpose of all air traffic control systems is to prevent air collisions while at the same time maintaining an orderly traffic rate into airport runways. Present air traffic control systems make use of PPI radar to provide the air traffic controller with a plan view of all the aircraft in his area of control. With this tool, the controller can see only the present space separation of the aircraft in one plane, and to vector the aircraft onto the runway using this information, he must mentally predict the closure rates, taking into account the diverse speeds of the aircraft and the directions of flight. On the other hand, this invention operates on the principle of time separation, automatically taking into account the present position, predicted position, and velocity as a function of time. By using the principle of time separation, the system automatically maintains distance separation, even when the various aircraft are flying at highly diverse speeds. It accomplishes this by computing and generating the predicted flight path as a function of time and displaying the path on the radar PPI scope.

Broadly, this invention computes the predicted flight path of each aircraft from its initial position to touchdown on the runway, and it displays the predicted path, or portions of it, from its predicted present position to its position some period of time hence. Knowing the predicted position of each aircraft during any future time, the controller has sufficient information to alter the flight path of any one or more of the aircraft to maintain adequate space separations at all times.

The predicted flight path for each aircraft under control contains the same programmed logic; i.e., the basic parameters of all flight paths include two turns ($\beta$ and $\gamma$) from the initial heading to approximate alignment with the final approach heading, a straight-line flight $\tau$, and a flight along the final approach (including a small optional turn $\alpha$ and straight lines F and G). Each turn is made at a selected fixed turn rate. Time-wise, the predicted flights of all aircraft along the final approach are identical; that is, while the length of each line or the diameter of a turn circle depends on aircraft velocity, each plane makes the same maneuver for the same period of time. The time of flight of each aircraft on turns $\beta$ and $\gamma$ and on line $\tau$ are variables, depending on aircraft position, velocity, and altitude. An additional variable delay line D may also be introduced to delay the time of arrival of any aircraft to the final approach position so as to avoid a potential conflict with other aircraft.

The various parameters are established as analog voltages, the magnitudes of which represent time, and these voltages are used to control an aircraft flight simulator. Starting at the runway, the simulator output is set at zero heading with respect to the runway. The heading is then altered in response to each analog voltage to either start or stop a simulated turn at the various analog times. The headings are multiplied by velocity and integrated to derive voltages which are a function of instantaneous predicted position. The latter voltages are repetitively generated and are used to drive the beam of the radar PPI scope on a time-sharing basis, whereby the radar video and the predicted paths are simultaneously displayed.

The primary object of this invention is to compute and generate voltages representing the predicted flight path of an aircraft from an initial position in space to touchdown, and to display said path, or portions thereof.

Another object of this invention is to compute and generate voltages representing the predicted flight path of an aircraft from an initial position in space to touchdown, and to display said path from its present predicted position to its predicted position at a further time.

Still another object of this invention is to provide an aircraft flight simulator having an output voltage which is a function of instantaneous predicted aircraft heading, said output voltage being controlled as a function of time to generate voltages representing the predicted flight path of an aircraft, and to display said flight path on a PPI radar scope.

Another object of this invention is to provide means for the generation of three-dimensional planned flight paths for aircraft and for the selective display of the paths.

For other objects of this invention, reference should now be made to the following detailed specification and to the accompanying drawings in which.

FIGURE 3, comprising FIGURES 3A, 3B, and 3C when laid end-to-end in that order, is an over-all block diagram of the system, corresponding Roman numerals indicating connections not otherwise shown;

FIGURE 4 is illustrative of the various time summations performed in the time voltage summer;

FIGURE 5 is a schematic representation of the system commutator (the master timing generator and channel switch unit);

FIGURES 6 and 7 are series of curves showing the various time relations throughout the system;

FIGURE 8 is a block diagram of the aircraft altitude simulator;

FIGURES 9, 10, and 11 illustrate the operation of the heading resolver;

FIGURE 12 is a schematic diagram of the turn direction gates; and

Figures 13, 14:
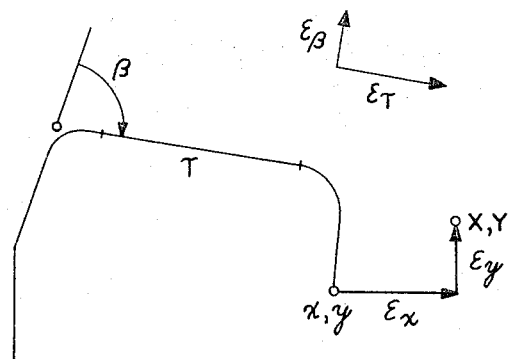

FIGURES 13 and 14 are plots of the servo error resolution and $\beta$ angular error, respectively.

*Definitions*

The following definitions are established for the purpose of aiding the understanding of the following description:

$\phi'$ = initial geographical aircraft heading
$\phi$ = instantaneous aircraft heading with respect to runway
$\phi_R$ = runway heading
$\dot{\phi}$ = aircraft turning rate (degrees/second)
$\phi_I$ = initial heading with respect to runway
$\alpha$ = a programmed turn
$\beta$ = a computed turn
$\gamma$ = a second computed turn
Legs F and G = programmed straight-line flights
$\tau$ = computed variable length straight-line flight
D = manually introduced straight-line delay flight
x, y = runway coordinates of instantaneous computed position of aircraft
x', y' = runway coordinates of actual instantaneous position of aircraft X, Y=geographical coordinates of instantaneous computed aircraft position X', Y'=geographical coordinates of instantaneous actual aircraft position $\epsilon_y$, $\epsilon_x$=voltage representing errors between $x'$, $x$ and $y'$, $y$ $\epsilon_\beta$, $\epsilon_\tau$=voltage representing difference between actual and computed positions in $\beta$, $\tau$ coordinates. The $\beta$, $\tau$ coordinates are polar, having a pole at the junction of lines G and $\tau$ (both of which are tangent to the $\beta$ turn circle). The angle of $\tau$ is measured with respect to the runway heading $\phi_R$.

$A_I$=initial aircraft altitude $A_F$=final aircraft altitude for making runway approach $\dot{A}$=rate of descent $V_I$=initial aircraft indicated velocity $V_F$=final aircraft indicated velocity for making runway approach $\dot{V}$=deceleration rate $V_T$=true velocity (corrected for altitude)

The use of a superscript with a reference character (e.g., $28^1$, $28^2$, or $28^n$) indicates the channel in which element is operated.

The flight path parameters

The system involves the use of pre-programmed logic to generate a future flight path for each aircraft under control. Each future flight path will have identical characteristics, in so far as its computation is concerned, and basically each path includes the various elements depicted in FIGURE 1, to which reference is now made.

Starting from present position on an initial geographical heading $\phi'$, an aircraft must fly a path which will eventually bring him in line with the runway on a runway heading $\phi_R$. Thus in a complete flight, the aircraft must turn a number of degrees equal to its initial heading $\phi_I$ with respect to the runway, where $$\phi_I = \phi' - \phi_R$$

To accomplish this total turn of $\phi_I$ degrees, every aircraft path includes three programmed turns $\alpha$, $\beta$, and $\gamma$. Each of these turns may be positive or negative (right or left). Thus, $$\phi = \pm\alpha \pm \beta \pm \gamma.$$

The $\alpha$ turn is not basic to this system, but is fixed number of degrees for all aircraft of a given type, and is included for the purpose of providing greater flexibility to the pilot in aligning his final approach. The $\alpha$ turn is useful in that it permits last-minute corrections of various pilot errors. The $\beta$ and $\gamma$ turns have variable numbers of degrees which are developed by the system's computer.

The remander of the flight path includes several straight legs F, G, T, and D. Legs F and G have fixed time parameters for all aircraft, while leg T is a computed variable, and leg D is a manual-introduced delay used for purposes to be explained. While each aircraft will fly a course which is defined by the foregoing path elements, the path elements $\beta$, $\gamma$, T and D are variables in time, magnitude and direction. The magnitude of a particular path element may be zero.

In establishing a path, each of the parameters is generated in reverse; that is, for an aircraft located at point P, the flight path is generated starting at the runway. This effects circuit simplicity since all aircraft must fly the same final headings onto runway, and by simulating the flight in reverse, the various computer and simulator circuitry can be reset to the same voltages for all flights.

Moreover, each path parameter is generated as a function of time. If the velocity of the aircraft is known, the lengths of the various legs and turns are computed as a function of time, and then simulated. The turning rate $\dot{\varphi}$ for all aircraft is established at one of two predetermined constants. In practice, the turning rates $\dot{\varphi}$ are selected at 1.5° per second for jet aircraft and 3.0 per second for propeller aircraft.

Figure 2:
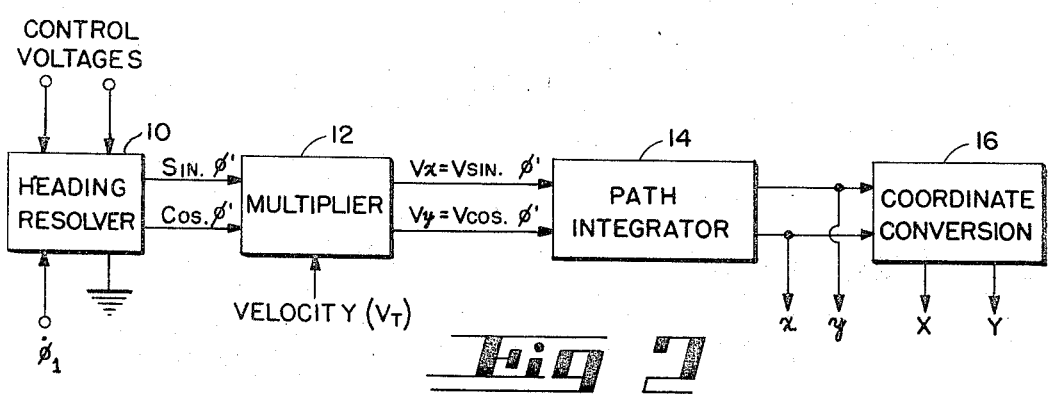
FIGURE 2 is a block diagram showing the predicted flight path simulating system.

To generate the various legs and turns, a flight simulator is used to generate voltages representing the instantaneous predicted positions of an aircraft. The simulator is shown diagrammatically in FIGURE 2, and it includes a heading resolver 10, the function of which is to generate sine and cosine functions of the instantaneous heading with respect to the runway. The heading resolver 10 is, in essence, an oscillator, which upon appropriate signal is capable of oscillating (or rotating) at a rate which is a function of the turning rate $\dot{\varphi}$ for only small portions of one cycle, and is capable of being started, stopped, and started again from its stopped position. Also, it is capable of rotation in either direction. These functions are then multiplied in a multiplier 12 by the known true indicated velocity $V_T$ of the aircraft to derive voltages which are functions of velocity in runway coordinates, i.e., sin $\phi$ and cos $\phi$. After a wind correction, there is an integration in a path integrator 14 to produce voltages $x$ and $y$ which are functions of instantaneous predicted position in runway coordinates. The $x$ and $y$ voltages are then converted into geographical coordinates in a coordinate converter to yield instantaneous voltages X and Y which are a function of instantaneous aircraft position in geographical coordinates.

Knowing the indicated velocity $V_T$ of an aircraft, and its turn rate $\dot{\varphi}$, the length of time required to traverse each leg and turn of the path is ascertainable. The system establishes a plurality of voltages, each representing a given time within the path period. Again referring to FIGURE 1, there are sixteen periods of time, $t_0$ to $t_{15}$, each of which is defined as follows:

$t_0$=start of reverse simulated flight
$t_1$=start of $\alpha$ turn
$t_2$=end of $\alpha$ turn
$t_3$=start of $\beta$ turn
$t_4$=end of $\beta$ turn
$t_5$=start of $\gamma$ turn
$t_6$=end of $\gamma$ turn
$t_7$=end of reverse simulated flight
$t_8$=time when control of PPI sweep is taken from the PPI's internal sweep, video, and blanking circuits
$t_9$=the start of the PPI scope beam brightening
$t_{10}$=the end of the PPI scope beam brightening
$t_{11}$=time when control of the PPI sweep is returned to its internal circuits
$t_{12}$=the time of starting ascent from the final altitude $A_F$ towards the initial altitude $A_I$
$t_{13}$=the time of starting acceleration from the final velocity $V_F$ to initial velocity $V_I$
$t_{14}$=the time of starting the sampling of the initial position
$t_{15}$=the time of ending the sampling of the initial position The time of flight along the legs F and G and the $\alpha$ turn are fixed constants (time-wise) for all aircraft, and therefore times from $t_0$ to $t_3$ are each constants which may be set into the system. The time of flight along the $\beta$ and $\gamma$ turns are computer-determined variables and hence times $t_4$ to $t_6$ are variables. The time of flight along delay leg D from $t_6$ to $t_7$ is a manually insertable variable delay time.

Control voltages are established representing each of the foregoing times, and these voltages are used to start and stop the operation of the heading resolver 10 to establish the predicted path, and subsequently to display it. The control voltages representing times $t_0$ to $t_7$ and $t_{14}$ and $t_{15}$ serve to establish the path. The voltages representing $t_8$ to $t_{11}$ serve to display the path at certain times on the PPI scope. The voltages representing $t_{12}$ and $t_{13}$ serve to establish instructions with respect to altitude and velocity. Each of the control voltages is set up in a memory hereinafter to be described in connection with a time voltage summer, and the memorized control voltages serve to generate signal gates for controlling the resolver 10.

*Adaptive portion of system*

The system for establishing the control voltages for the resolver 10 and for displaying an established path is diagrammatically illustrated in FIGURE 3. The system includes a time voltage summer 18 having output lines $t_1$ to $t_{15}$ connected into a time coincidence unit 20, the function of which is to provide signal gates. The time voltage summer 18 also has 15 input leads, each labeled in accordance with the time periods which are inserted. The various times $t_0$ to $t_{15}$ exist as analog voltages within the time voltage summer 18, and once established, remain unchanged during an aircraft approach flight, except that the voltage representing $t_{10}$ varies at a linear rate to represent real time. The time voltage summer performs the following sequential voltage summations to obtain the time analog voltages representing $t_0$ to $t_{15}$:

$$t_0 = t_0$$
$$t_1 = t_0 + (t_1 - t_0)$$
$$t_2 = t_1 + (t_2 - t_1)$$
$$t_3 = t_2 + (t_3 - t_2)$$
$$t_4 = t_3 + (t_4 - t_3)$$
$$t_5 = t_4 + (t_5 - t_4)$$
$$t_6 = t_5 + (t_6 - t_5)$$
$$t_7 = t_6 + (t_7 - t_6)$$
$$t_8 = t_7 + (t_8 - t_7)$$
$$t_9 = t_8 + (t_9 - t_8)$$
$$t_{10} = t_9 + (t_{10} - t_9)$$
$$t_{11} = t_{10} + (t_{11} - t_{10})$$
$$t_{12} = t_{11} + (t_{12} - t_{11})$$
$$t_{13} = t_{12} + (t_{13} - t_{12})$$
$$t_{14} = t_{13} + (t_{14} - t_{13})$$
$$t_{15} = t_{14} + (t_{15} - t_{14})$$

As noted before, the times $t_1$ to $t_3$ are fixed for all aircraft, and therefore the voltages representing these times are adjustably set up in the time voltage summer 18 by manual adjustments of internal potentiometers. The times $t_4$ to $t_6$ are variables depending on aircraft position, heading, velocity, and altitude. To establish times $t_4$, $t_5$, and $t_6$, the length of time to complete the $\beta$ turn, the length of time to fly the line $\tau$, and the length of time to complete the $\gamma$ turn must be computed. The time $t_7$ is represented by a manually established voltage representing the end of delay line D.

Referring again to FIGURE 3, the $x$, $y$ voltage outputs from the path integrator 14 (see FIGURE 3C) represent computed instantaneous position of the airplane in runway coordinates. These $x$ and $y$ voltages are applied, respectively, to a coincidence error unit 22 (see FIGURE 3C). Also supplied to the coincidence error unit 22 are voltages representing the position of the aircraft $x'$, $y'$ in runway coordinates. The $x'$, $y'$ voltages are produced from a coordinate converter 24 to which X', Y' voltages representing the actual geographical position of the aircraft have been applied. The X', Y' voltages may be manually developed or provided from an automatic tracker (not shown).

The $x'$, $y'$ voltages and the $x$, $y$ voltages are compared in the coincidence error unit 22 during a sampling period from $t_{14}$ to $t_{15}$. If there is a voltage difference between the voltages $y$ and $y'$, an error signal $\epsilon_y$ is developed. If there is a voltage difference between the voltages $x$ and $x'$, an error signal $\epsilon_x$ is developed. The voltage signals $\epsilon_x$ and $\epsilon_y$ are then converted by means of a coordinate converter 26 into $\beta$, $\tau$ coordinates to produce error voltages $\epsilon_\beta$ and $\epsilon_\tau$. The purpose of the later conversion will be hereinafter explained. The $\epsilon_\beta$ and $\epsilon_\tau$ error voltage outputs are then applied, respectively, through a selected channel switch $27^1$, $27^2$, or $27^n$ or $29^1$, $29^2$, or $29^n$ to one of three electromechanical $\beta$ servos 28 and $\tau$ servos 30. While three servos $28^1$, $28^2$, and $28^n$ and three servos $30^1$, $30^2$, and $30^n$ are shown, any number $n$ may be used depending on the number of airplanes under control; i.e., the number of channels in use. For the present it will be assumed that only one aircraft is in the system. The servos 28 and 30 serve to drive their respective $\beta$ memory potentiometers $32^{1-n}$ and the $\tau$ memory potentiometers $34^{1-n}$ through a mechanical coupling (indicated by the dotted line connection).

The output from the $\beta$ memory potentiometer is then applied to a turn summer 36 where various arithmetic operations are performed. In order to determine the time necessary to complete a turn, it is necessary to divide the turn angle $\beta$ or $\gamma$ by the turn rate $\phi$. Since the output of the $\beta$ memory represents the $\beta$ turn, the voltage output from the $\beta$ memory 32 is divided by a voltage proportional to a selected one of two available turn rates by means of a conventional divider circuit 38. Selection of the turn rate is accomplished in a manner hereinafter described. The output from the divider 38 is, therefore, a voltage representing $t_4 - t_3$. To develop the $\gamma$ voltage proportional to the $\gamma$ turn, voltages proportional to the $\beta$, $\alpha$ turns are subtracted from initial heading $\phi_I$ in an adder 40, and the time $t_6 - t_5$ to complete the $\alpha$ turn is developed by dividing the voltage from adder 40 by the selected turn rate voltage $\phi$ in a conventional divider circuit 42. The output from the divider circuit 42 is therefore a voltage equal to $t_6 - t_5$.

If a flight path defined by times $t_1$ to $t_6$ creates an apparent conflict with another aircraft, a delay may be introduced into the path of any selected aircraft so that aircraft is required to fly an additional distance along the delay line D. The time along the delay line is represented by a manually adjustable voltage introduced at the line labeled $t_7 - t_6$, from any selected input terminal $D^1$, $D^2$, or $D^n$.

The various voltages $t_1$, $t_2 - t_1$, and so forth, are summed in the time voltage summer 18 where discrete voltages representing times $t_1$ to $t_{15}$ are produced. The voltages $t_1$ to $t_{15}$ are then applied to the time coincidence unit 20. Also applied to the time coincidence unit 20 is a voltage ramp 44 developed by a fast time clock 46. The voltage ramp 44 represents a period of, for example, 30 minutes, but is produced in 3.6 microseconds. When the voltage representing time $t_1$ is equal to the voltage on the ramp 44, a signal gate output is produced at line 48 at the turn command portion of the unit 20 and is applied to the heading resolver 10 through turn direction gates 47. The outputs developed at line 49L and 49R of the turn gates 47 control the starting, stopping, and direction of rotation of the heading resolver 10. The turn direction gates 47 are in turn controlled by $\beta$ and $\gamma$ turn logic units $53\beta$ and $53\gamma$, respectively.

It will be noted that the $\beta$ voltage output from the $\beta$ memories 32 and the $\gamma$ voltage output from the adder 40 are, respectively, applied to the turn logic circuits $53\beta$ and $53\gamma$. These circuits are polarity detectors, each having two outputs of opposite reversible polarity; that is to say, with a positive voltage applied to a turn logic circuit, one of the outputs will be positive while the other is negative, and with a negative voltage applied, the polarities of the outputs are reversed. Such detectors are conventional, and for simplicity will not be described herein. The outputs from the turn logic circuits $53\beta$ and $53\gamma$ are connected directly to the turn direction gates 47 for controlling the direction of rotation of the heading resolver 10. The direction of rotation of the heading resolver 10 for making the $\alpha$ turn is relay-operated to produce similar positive or negative outputs, depending upon the initial position of the aircraft. The turn direction gate circuit will hereinafter be described in detail.

The heading resolver produces sine and cosine output voltages which initially are set at zero degrees with respect to runway heading, so that the sine output voltage is at zero, and the cosine voltage output is at a maximum negative value (see FIGURE 7). However, upon the occurrence of a signal gate output at lines 48 and 49L or 49R, the heading resolver begins to rotate at a rate equivalent to $\dot{\phi}$, the selected turn rate of the particular aircraft, and it will continue to rotate until time $t_2$ when a second coincidence pulse is produced at line 48 to stop the heading resolver. Thus, from time $t_0$ to $t_1$ the output from the heading resolver is constant, but at $t_1$ the sine and cosine functions begin to rotate and continue to rotate until time $t_2$. This completes the $\alpha$ turn. The heading resolver then maintains a constant output until time $t_3$ when a coincidence gate starts the $\beta$ turn. To this point all aircraft will have made the same maneuvers at the same time.

The output of heading resolver 10 rotates from time $t_3$ until the voltage at time $t_4$ is coincident with the voltage of the ramp 44, at which time the resolver 10 is stopped by the coincidetnce gate output at lines 48 and 49L or 49R, thereby completing the $\beta$ turn. The outputs of the heading resolver are than maintained constant until time $t_5$ when there is again coincidence at time $t_5$ and the $\gamma$ turn is begun. The next coincidence at time $t_6$ serves to stop the resolver to complete the $\gamma$ turn. If the path thus far described were displayed, the initial position of the aircraft would be coincident with the end of the $\gamma$ turn. Comparing this displayed path with display paths of other aircraft, there might appear to be a collision conflict between this aircraft and other aircraft already displayed. In that event at delay from $t_6$ to $t_7$ would be introduced at an appropriate terminal D, thereby altering the flight path of a conflicting aircraft by a length of time equivalent to the delay voltage.

Display portion of system

Once the various times $t_1$ to $t_7$ are established in the time voltage summer 18, the system is prepared to iteratively present the X, Y voltage outputs to the deflection coils $55_x$, $55_y$ of a PPI radar scope 57 through a time-share cathode-ray tube switch system 50. At this point in time the outputs from the memories 34 and the turn summer 36 are fixed by opening the channel switches 27 and 29 at the servos 28 and 30, and a real time clock 52 is turned on in the selected channel by means of a selected switch $53^1$, $53^2$, or $53^n$. To understand how the display is accomplished, both during the initial computations and thereafter, reference is again made to FIGURE 1.

As pointed out, the path is set up by generating times $t_0$ to $t_7$ in the time voltage summer 18. The path, or a portion of it, is displayed by disconnecting the usual PPI sweeps and substituting the X, Y, output from the cathode-ray tube switch system 50 to the sweep circuits $55_x$ and $55_y$ of the PPI scope 57 during a predetermined period. The predetermined period may extend (repetitively) from $t_0$ to $t_7$, and the entire path would be displayed. This is done during the period the path is being set up. Once the path is set up, only those portions of the path representing the present predicted position of the airplane to some future time, say, two minutes hence, is displayed thereby avoiding clutter of the display, and utilizing less of the video time.

Recalling that the voltage output from the fast time clock 46 is a sawtooth wave having a ramp, the maximum voltage of which represents real time, but having a duration equal to 1/500,000 of real time, the output from the time coincidence unit 20 and the gates 47 to the heading resolver 10 is a series of voltages which is continuously repeated. That is to say, the gates generated by comparing the voltages representing time $t_0$ to $t_7$ are repeated at a rate equal to the repetition rate of the sawtooth ramp 44. Thus, if the X, Y output from the cathode-ray tube switch system 50 is connected to the cathode-ray tube sweep circuits during a time period $t_0$ to $t_7$, while at the same time disconnecting the cathode-ray tube sweep circuit from its usual PPI sweep, the path from $t_0$ to $t_7$ is traced by the cathode-ray beam; or, as preferred, the X, Y, output may be connected during only selected portions of the time period $t_0$ to $t_7$.

Referring again to FIGURE 3, a voltage representing elapsed time, the output of a selected channel of tthe real time clocks $52^1$, $52^2$, or $52^n$ is applied through a selected switch $59^1$, $59^2$, or $59^n$ to the time voltage summer 18 where it is subtracted from the voltage representing time $t_7$ to derive a voltage representing time $t_{10}$. Time $t_{10}$ represents predicted present position, and it is generally preferable to display the path from time $t_{10}$. However, before the real time clock is started, $t_{10}$ equals $t_7$. Time $t_9$ is some arbitrary future time from time $t_{10}$ during which it is desired to display the predicted path. Time $t_9$ can be made to coincide with time $t_0$, or any other time between $t_0$ and $t_{10}$. Time $t_9$ is derived by subtracting the voltage representing the display period from the voltage representing $t_{10}$. Since some time must be permitted for disconnecting the PPI sweep and connecting the sweep, a slewing period from $t_8$ to $t_9$ is developed, and for reconnecting the PPI sweep, a slewing time from $t_{10}$ to $t_{11}$ is generated.

Figure 1:
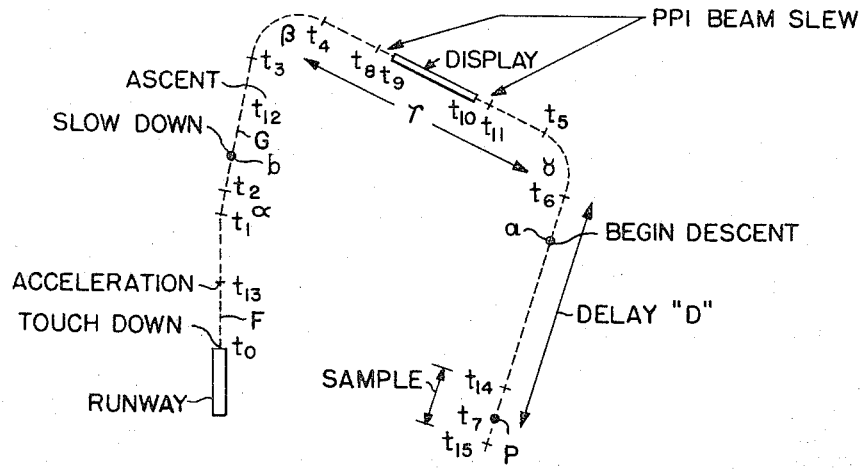
FIGURE 1 depicts the parameters of a typical predicted flight path from an initial position to touchdown at a runway, the solid line representing that portion of the path which is displayed.

In the example shown in FIGURE 1, the initial position of the aircraft is indicated at time $t_7$. Its present predicted position is indicated at time $t_{10}$. Bearing in mind that the path is predicted and plotted in reverse, the display period is from time $t_9$ to time $t_{10}$. The time interval $t_{10}-t_7$, equal to the elapsed time since the aircraft has been scheduled, is not displayed.

In FIGURE 4 the various times for the flight path of FIGURE 1 are plotted with the abscissa indicating times $t_0$ to $t_{15}$, the ordinate displaying the various summations in the summer 15. It is noted that times $t_1$ to $t_7$ progressively increase from $t_0$. When the real time clock 52 is first started, $t_{10}$ is equal is equal to $t_7$, but $t_{10}$ is a continuously increasing factor which is subtracted from $t_7$. Time $t_0$ occurs after the beginning of each ramp 44 of the fast time clock 46. The time $t_{11}-t_{10}$ is an arbitrarily selected short slewing interval which is added to $t_{10}$. Time $t_9-t_{10}$ is subtracted from time $t_{10}$. Another slewing period is generated by subtracting the period $t_8-t_9$ from $t_{10}$. Times $t_{12}$ and $t_{13}$ are added to $t_0$. Times $t_{14}$ and $t_{15}$, respectively, are added to and subtracted from $t_7$.

When there is coincidence in the time coincidence unit 20 between the voltages at times $t_8$ to $t_{11}$ and the ramp 44, a series of gates are developed at line 61 and applied to the cathode-ray tube switch system 50 which serves to disconnect the usual PPI video sweep circuits and to connect the X, Y output from the coordinate converter 16. Thus, with the times $t_1$ to $t_7$ fixed at the output of the time voltage summer 18, and with the times $t_8$ to $t_{11}$ changing in accordance with real time, gates are developed at the output of the time coincidence unit 20 at the lines 48 and 61, respectively, during each cycle of the ramp 44. It will be noted at this point that the instant of producing a ramp 44 is controlled by a master timing generator and channel switch unit 52, the operation of which will be described hereinafter. The unit 52 also serves to time share the various channels 1 to $n$. Thus, the gate voltages on line 48 are presented to the heading resolver 10 via the gates 47 and control the heading resolver 10 from time $t_0$ to the end of the predicted path. During that period the cathode-ray tube switch system 50 is being controlled by the gate outputs presented through line 61. Although only a single line is illustrated, line 61 represents several lead lines carrying the gate signal to various circuits in the system 50. Remembering that the predicted path is generated and displayed in reverse, at time $t_8$ the cathode-ray tube sweep system is disconnected from its usual PPI sweep, and the X–Y output is connected through the switch system 50 to the sweep circuits of the PPI scope. During the time from $t_8$ to $t_9$ the beam of the cathode-ray tube is blanked to allow time for slewing. At time $t_{10}$, the gate signal on line 61 serves to disconnect the X–Y output and reconnect the video sweep.

The beam of the PPI scope is again blanked for slewing during the period from $t_{10}$ to $t_{11}$. Thus, at time $t_8$ the X and Y voltages drive the beam of the cathode-ray tube along the generated predicted path. However, at time $t_{10}$ the gate output from line 61 to the cathode-ray tube switch system 50 serves to disconnect the X-Y voltage output, and serves to reconnect the usual PPI sweep to the cathode-ray tube. This cycle is repeated each time the output ramp 44 from the fast time clock is applied to the time coincidence unit 20.

Velocity and altitude

In addition to generating and plotting a predicted path, the system is also capable of providing the aircraft controller with information regarding the point in time and space when the aircraft should begin descent from its initial altitude $A_I$ to its final altitude $A_F$ and information as to the point and time in space when the aircraft should begin deceleration from its initial velocity $V_I$ to its final velocity $V_F$. Each of these points is represented on the plotted flight path by visual dots $a$ and $b$, respectively.

Altitude

The simulator used by the system includes an aircraft altitude simulator 54, the function of which is to produce an output voltage A simulating the predicted instantaneous aircraft altitude throughout the entire predicted path of the aircraft. The aircraft altitude simulator 54 contains three inputs, namely, initial altitude $A_I$, final altitude $A_F$, and rate of descent $\dot{A}$.

It should be borne in mind that the dot $a$ is also generated in reverse. All aircraft are programmed to fly at a final altitude $A_F$ for a fixed period of time $t_{12}-t_0$. Therefore, at the beginning of each cycle the output of the simulator 54 is a voltage equal to $A_F$. However, upon the occurrence of coincidence in the time coincidence unit 20, the signal gate, which is applied to the simulator 54 through the line 58, serves to start a voltage ramp 60, having a rate of increase in voltage which is a direct function of rate of the descent $\dot{A}$. At some undetermined time there is coincidence between the voltage $A_I$ and the voltage of the ramp 60, and a signal gate is produced on line 62 and applied to a dot generator 63. The dot generator serves to intensify the beam of the cathode-ray tube at the time of coincidence. At the time dot $a$ is generated, the output of the simulator 54 is fixed at the initial altitude $A_I$. The aircraft simulator 54 will be described in detail hereinafter.

Velocity

The next function for consideration is velocity. Each airplane flying at an initial velocity $V_I$ is programmed to fly at a final velocity $V_F$ for a given time before touchdown for making proper approach to the runway. To accomplish this result, the aircraft must start decelerating at a rate $\dot{V}$ at some yet undetermined point represented by the dot $b$ along the predicted path. Therefore, a velocity simulator 64, having functions very similar to that of the altitude simulator, is incorporated. Since true velocity $V_T$ is a function of instantaneous altitude A, the velocity simulator is provided with air density correction means, and the output from the altitude simulator 54 is continuously applied to it through line 67 to effect the appropriate corrections.

The controller sets into a selected channel of the simulator 64 the initial aircraft velocity $V_I$, final velocity $V_F$, and deceleration rate $\dot{V}$, and the output of the velocity simulator is the predicted instantaneous true aircraft velocity $V_T$. Upon the occurrence of coincidence between the voltage of ramp 44 and the voltage in the time voltage summer 18 at $t_{13}$, a signal gate is produced at line 66 and applied to the velocity simulator 64 for initiating a ramp 68 having an increasing rate (plotted in reverse) proportional to $\dot{V}$. Upon coincidence of the voltage representing initial velocity $V_I$ and the voltage of the ramp 68, a gate is produced which is applied to the dot generator 63 to intensify that cathode-ray tube at point $b$. Thereafter, the output is $V_I$.

Wind velocity

The system also includes a wind velocity function generator 70, the function of which is to produce geographical wind velocity components $W_y$ and $W_x$. Since wind velocity is also a function of altitude, the output from the aircraft altitude simulator 54 is also applied through line 71 to the wind velocity function generator 70. Since the path integrator uses runway coordinates, the system also includes a coordinate converter 72 for converting the wind components into runway coordinates prior to application to the path integrator 14.

Multiple channel operation

The master timing generator and channel switch unit 52 provides the time-sharing means for simultaneously displaying the predicted paths of any plurality of aircraft. The unit 52 provides a separate, sequentially energized channel for each aircraft.

Referring again to FIGURE 1, it will be recalled that a predicted path is generated by establishing the various times $t_1$ to $t_{15}$. Since most of the times are fixed or are the same for all the aircraft, the time voltage summer 18 is common to all channels, but separate means are provided for each channel for sequentially establishing the times $t_4-t_3$ ($\beta$), $t_5-t_4$ ($\tau$), $t_6-t_5$ ($\gamma$), $t_7-t_6$ (Delay), and $t_{10}-t_7$ (Elapsed time). For this purpose each channel is provided with a separate $\beta$ servo $28^1$, $28^2$, or $28^n$ and $\beta$ memory $32^1$, $32^2$, or $32^n$, a separate $\tau$ servo $30^1$, $30^2$, or $30^n$ and $\tau$ memory $34^1$, $34^2$, or $34^n$, and a separate real time clock $52^1$, $52^2$, or $52^n$. $n$ may equal any practical number.

Master timing

FIGURE 5 is a schematic representation of the unit 52, in which $n$ is equal to 15. The details of only one channel are illustrated, but the remaining channels are identical.

The master timing generator and channel switch unit 52 includes an $n$ segment commutator 74, each segment being designated for a single channel. Within the unit 52 is a rotor contact 76 continuously rotated on a shaft 78 by a synchronous motor (not shown) and connected to a source of potential illustrated as a battery 80. While a mechanical commutator is illustrated for simplicity, it is noted that an electronic commutator is contemplated and preferred. The battery 80 is connected through each of the channel segments to a plurality of input potentiometers which serve to supply appropriate data to each channel of the system computer. The contact 76 is shown in the channel 1 segment position.

The input potentiometers connected to each segment include those necessary for supplying the data necessary for generating the path of each aircraft. This data includes initial altitude $A_I$, rate of descent $\dot{A}$, final velocity $V_F$, initial velocity $V_I$, the $\beta$ turn, the $\tau$ line, initial bearing with respect to the runway $\phi_I$, and the delay line D. Each of the potentiometers is functionally designated as $A_I$, $\dot{A}$, $V_F$, $V_I$, $\beta$, $\tau$, $\phi_I$, and D, respectively. The $\beta$ potentiometer and the $\tau$ potentiometer comprise, respectively, the $\beta$ memory potentiometer 32 and the $\tau$ memory 34. Each segment also is connected through a switch 82 to one of two contacts designated as $\phi_1$ and $\phi_2$ and to a line 84 designated as "To channel switch control." During a complete cycle of the rotor contact 76, the various input potentiometers are at full potential for $1/n$ of the total time, and are at zero potential for the remainder of the time.

Each of the input potentiometers $A_I$, $\dot{A}$, $V_F$, $V_I$, $\phi_I$, and D are manually controlled, that is, the positions of the potentiometer taps calibrated in terms of aircraft position and other data, and are set up by the operator. The taps of the $\beta$ and $\tau$ potentiometers are automatically positioned by the $\beta$ and $\tau$ servos 32 and 34, respectively. The switch 82 for selecting the turn rate $\dot{\phi}_1$ or $\dot{\phi}_2$ is manually selected by the aircraft controller, while the voltage on line 84 serves to automatically open and close various switches 27, 29, 59 within its respective channel. While these switches are illustrated, for simplicity, as mechanical single-pole switches which may be relay operated, electronic switches are contemplated and preferred for a practical system.

If the switch 82 is contacting the $\dot{\phi}_1$ contact, the voltage from the battery 80 is applied to a circuit serving to introduce a turn rate $\dot{\phi}_1$, for example, 3 degrees per second. On the other hand, if the switch 82 is connected to the $\dot{\phi}_2$ terminal, the voltage from the source 80 is not so connected, and hence the turn rate is established at some other value, for example, 1.5 degrees per second. All aircraft, depending on whether it is a jet or propeller aircraft, will fly at one or the other turning rates, $\dot{\phi}_1$ or $\dot{\phi}_2$.

The voltages developed across each of the input potentiometers are, respectively, applied to summing amplifiers 86 to 100, and the output circuit of each summing amplifier is connected to a designated input terminal of the system (as shown in FIGURE 3).

As the rotor contact 76 rotates, each channel segment is sequentially energized for $1/n$ of total time of revolution of the contact 76. All of the potentiometers in an energized channel have voltages produced on them proportional to the various input data. The potentiometers in the remaining channels are at zero volts. In addition, the battery 80 is sequentially connected to the lines 82 and 84 in the $n$ channels. Thus, the input to the Aircraft Simulator 54, the Air Density Correction Unit 64, the $\beta$ ($t_4-t_3$) input to the adder 40, the $\tau$ input ($t_5-t_4$) to the time voltage summer 18, and the delay input D ($t_7-t_6$) to the time voltage summer 18 is sequentially inserted into the system by the sequential application of the energizing potential from the battery 80, while at the same time the various switches are appropriately opened and closed, and the appropriate turn rate $\dot{\phi}$ is introduced.

The time status of various channels is illustrated in FIGURE 6. When the rotor contact 76 initially makes contact with the channel 1 segments, the potential of the battery 80 is connected across each of the input potentiometers. In effect, the rotor contact 76 in conjunction with the channel 1 segment serves to produce a square wave 75 having a leading and a trailing edge. The battery is applied through the channel 1 segment and the line 84 to the fast time clock 46, in essence an integrator, to produce the voltage ramp 44. The trailing edge of the wave 75 from the channel 1 segment serves to reset the fast time clock 46, i.e., discharge the integrator and return the ramp 44 to its initial value. The same cycle is continuously repeated through each of the channels.

FIGURE 7 illustrates the various time sequences within a single channel during the period of the square wave 75. While the fast time clock occupies substantially the entire time of wave 75, and while the square waves 75 are continuously generated in one channel or another, display time $t_9$ to $t_{10}$ occupies approximately 7 percent of the total time within a given channel (approximately 2 minutes out of 30 minutes). Assuming all channels are in operation, only 7 percent of the available radar video time of the PPI scope is used for displaying the generated paths.

The aircraft altitude simulator 54 is shown in FIGURE 8. Since the rotor contact 76 is positioned on the channel 1 segment of the commutator 74, the $\dot{A}^1$, $A^1_I$, and $A^1_F$ potentiometers are shown connected in circuit. It will be understood, however, that as the contact 76 moves, the appropriate $A^2$ potentiometers of channel 2 will be substituted, and so on.

The tap 102 of potentiometer $\dot{A}^1$, the tap 103 of potentiometer $A^1_I$, and the tap 105 of potentiometer $A^1_F$ are adjusted to represent rate of descent, initial altitude, and final altitude of the airplane under control. The voltage developed at the tap 102 is applied to an amplifier 104 where it is inverted to develop the appropriate rate of ascent (since the path is to be projected in reverse), and th inverted voltage is then applied through a normally closed switch 106 to an integrator 108. The voltage developed at tap 105 of the $A_F$ potentiometer is also applied to the integrator 108 through the normally closed switch 118. This input to the integrator serves to reset the integrator to its initial value or $A_F$. At time $t_{12}$ the output from the time coincidence unit 20 is applied to switch driver 116 to open the switch 118. The integrator 108 then begins integrating and its output comprises the voltage ramp 60 described in connection with FIGURE 3. The voltage ramp 60 is applied simultaneously to the air density correction unit 64 and to a comparator 110.

The voltage developed at the tap 103 of the $A^1_I$ potentiometer is also applied to the comparator 110 after amplification and inversion in an amplifier 112. Upon the occurrence of coincidence of the voltage at the ramp 60 and the voltage developed at the output of amplifier 112, an output pulse developed at the comparator is simultaneously applied to the dot generator 63 to produce the descent dot, and also to an electronic switch driver 114. The output from the switch driver 114 serves to open the normally closed switch 106, thereby removing the input to the integrator 108 and maintaining its output constant at a voltage representing the initial altitude $A^1_I$.

When the rotor contact 76 contacts the channel 2 segment, the $\dot{A}^2$ voltage is applied to the integrator 108 through the switch 106 (now closed since there is no coincidence between $A^2_I$ and the output of integrator 108) and the switch 118 closes, resetting integrator 108 at $A^2_F$, and the cycle repeats.

The heading resolver

The details of the heading resolver unit 10 are shown in block diagram form in FIGURE 9. The outputs from the heading resolver unit 10 are two analog voltages corresponding to the $\phi_x$ and $\phi_y$ components of aircraft heading which must be multiplied in the multiplier 12 by the aircraft's ground velocity to produce the $V_x$ and $V_y$ components of ground velocity. The desired outputs from the heading resolver 10 are:

$$\phi_y = \cos \phi$$

and $$\phi_x = \sin \phi$$

If the heading resolver operated continuously, the outputs would be continuously sine and cosine functions. However, in operation, the resolver is started and stopped at the various times $t_1$ to $t_7$, and hence the resolver outputs for the described predicted path are interrupted sine and cosine functions as illustrated in FIGURE 7. These sine and cosine voltages are obtained from a double integrator sine wave oscillator shown in FIGURE 10 which includes a cosine wave integrator 120, the output of which is a funtion of cos $\phi$ which is applied to a sine wave integrator 122, the output of which is a function of $-\sin \phi$. The output of the second integrator 122 is applied to a unit gain operational amplifier 124 which is required to give the necessary sign reversal to the input of the cosine integrator 120. The amplitude of oscillation is controlled by the initial condition of the integrators. With E volts on the cosine integration and zero volts on the second, the output of the cosine integrator 120 will be a cosine wave starting at its peak value of E volts. The output of the sine integrator 122 will be a sine wave starting at zero volts and reaching a peak value of E volts. The frequency of oscillation is controlled by the value of the resistors and capacitors of the integrator. This type of oscillator is useful in this system since it can be stopped at any point in the oscillatory cycle and when stopped, i.e., when the input voltage is removed or is zero, the oscillator will hold its output voltage; it can be restarted by reconnecting the inputs to the integrator; and, furthermore, the direction of rotation or oscillation of the oscillator can be reversed by switching the position of the inverter 124 from the position as shown to a position between the cosine integrator 120 and the sine integrator 122.

Referring to the complete block diagram of the heading resolver shown in FIGURE 9, the double integrator sine wave oscillator includes the cosine integrator 120, a sine integrator 122, and two inverters 124 and 124a, the inverter 124a being positioned between the integrators 120 and 122 and the inverter 124 being positioned after the integrators. In addition, the heading resolver includes a plurality of normally open electronic switches 126, 128, 130, and 132 for selectively connecting one of the inverters 124 or 124a in circuit. When the switches 128 and 130 are closed, and when the switches 126 and 132 are open, the oscillating loop is closed with the cosine integrator 120, the sine integrator 122, and the inverter 124 in the order listed, and the oscillations result in one direction. On the other hand, if the switches 126 and 132 are closed and the switches 128 and 130 are open, the oscillating loop consists of the cosine inverter 120, the inverter 124a and the sine integrator 122 in the order listed, and the oscillator rotates in the opposite direction. Therefore, if signals are applied to the appropriate switches, the system is capable of simulating left turns or right turns on command. For this purpose, a switch driver 134 connected to the electronic switches 126 and 132 provides an output, upon an appropriate input command at lines 49R and 49L, to close the switches 126 and 132. Similarly, a switch driver 136 is connected to the switches 128 and 130 for closing those switches upon appropriate command.

It will be recalled that the heading resolver must also be capable of rotation at one or two selected rates, and for this purpose the switch 82 connected to the various channel segments is used to select the appropriate $\phi$ contacts (refer to FIGURE 5). When the switch 82 is in the $\phi_1$ position, the voltage at the channel segments so connected is applied to a $\phi$ gate for effectively changing the natural frequency of each of the integrators in the double integrator oscillator. For that purpose the input circuit in each of the integrators 120 and 122 includes switches 138 and 138a connected to the $\phi$ contact.

The input circuit for each of the integrators 120 and 122 is diagrammatically shown in FIGURE 11 as including a resistor 140 connected in series to an amplifier 142. Series-connected resistors 144 and 146 are connected across the resistor 140 and the junction between the resistors 144 and 146 is connected to ground through the switch 138 which is normally non-conductive in the absence of a $\phi$ voltage. The summation of the values of resistors 144 and 146 is equal to the value of resistor 140, and therefore the input resistance to amplifier 142, when switch 138 is non-conductive, is equal to one half of the resistance of resistor 140. On the other hand, if switch 138 is conducting, the junction of resistors 144 and 146 is effectively connected to ground, and the input resistance to the amplifier 142 is doubled. Conduction of the switch 138 is accomplished by movement of the switch 82 to the $\phi_1$ contact. Thus, with the switch 82 on the $\phi_1$ contact, the oscillator rotates at a slow speed, while if connected to the $\phi_2$ contact, it rotates at a high speed. Any electronic switch may be used for grounding the junction of resistors 144 and 146, and in actual practice a four-diode shunt switch was used.

*Turn direction gates*

The details of the turn direction gates 21 of the time coincidence unit 20 are illustrated in FIGURE 12. The turn direction gate for controlling the $\beta$ turn includes a first gate comprising a vacuum tube triode 150 having a plate 152 connected to a B+ supply through a resistor 154, a grid 156, and a cathode 158, and a second gate comprising a vacuum tube triode 160 having a plate 162 connected to the B+ supply through a resistor 164, a grid 166, and a cathode 168. The cathodes 158 and 168 are interconnected and connected to ground through a vacuum tube triode 170 having a plate 172, a grid 174, and a cathode 176. The grids 156 and 166 are each biased beyond cut-off by means of connections through biasing resistors 178 and 180, respectively, to a source of B— supply potential. The input voltages to each of the grids 156 and 166 are supplied from the output of the turn logic units 53$\beta$ and 53$\gamma$. It will be recalled that the turn logic unit has two outputs of opposite polarity and that the polarities reverse, depending upon the polarity of the $\beta$ voltage. Thus, if the input to the triode 150 is negative, the input to the triode 160 is positive, but if the input to the triode 150 is positive, the input to the triode 160 is negative.

The grid 176 of triode 170 is also biased beyond cut-off by means of a connection through grid-biasing resistor 182 to the B— supply. The input to the triode 170 is supplied from the output of the time coincidence unit 20. The input to the triode is developed across input resistor 184 and is supplied to the grid 174 through parallel-connected resistor 186 and capacitor 188. The input voltage developed at the terminal 190 is that voltage which is developed at line 48 (see FIGURE 3) at the output of the time coincidence unit upon the occurrence of coincidence between the voltage of the ramp 44 and the various voltages developed in the time voltage summer 18. Upon the occurrence of a pulse developed by the occurrence of coincidence, the triode 170 is gated on and conduction from the B+ supply through the triode 170 will result through one or the other of gates 160, depending upon the status of the input signals applied to their respective grids. If the output from the turn logic circuit 53$\beta$ is such that the grid of triode 150 is negative, while the grid of triode 160 is positive, only the triode 160 will conduct, and a voltage will be developed at plate 162 and at the right turn bus 192. On the other hand, if the output from the turn logic circuit is such that the voltage applied to the grid of triode 150 is positive while the voltage at the grid of triode 160 is negative, conduction results through the triode 150, and the voltage is developed at its plate 152 and at the left turn bus 194. A duplicity of triodes 150, 160, and 170 is used with each set having similar inputs for the three turns $\alpha$, $\beta$, and $\gamma$. All three sets have a common return to B+ through resistors 154 and 164. Current therefore flows through either resistor 154 or 164 when the $\alpha$, $\beta$, and $\gamma$ turns are to be generated and in the proper resistor, depending on the direction of the turn. The voltage developed on the right turn bus is capacitively coupled through a capacitor 196 to the grid of a triode amplifier 198, and the resulting voltage is inverted to obtain the proper polarity by a triode amplifier 200. The cathode follower output from the triode amplifier 200 constitutes the right turn voltage developed at line 49R from the output of the turn direction gates 47. On the other hand, if a voltage is developed at the left turn bus 192, it is capacitively coupled through a capacitor 202 to a triode amplifier 204, the voltage output of which is inverted by means of a triode amplifier 206. The cathode follower output of triode amplifier 206 constitutes the left turn voltage developed at line 49L at the output of turn direction gates 21. The outputs of lines 49L and 49R are the inputs to the switch drivers 134 and 136, respectively, of the heading resolver unit shown in FIGURE 9.

Conversion to $\beta$, $\tau$ coordinates

Referring again to FIGURE 3, it will be recalled that the error voltages applied to the servos were converted into $\epsilon_\beta$ and $\epsilon_\tau$ coordinates. FIGURES 13 and 14, to which reference is now made, indicate the manner of this conversion.

The error signals $(X'-x')$ and $(Y'-y')$ are in rectangular coordinates. In order to drive the $\beta$ and $\tau$ servos, these errors must be resolved along the $\beta$ and $\tau$ axes. These new error signals $\epsilon_\beta$ and $\epsilon_\tau$ are mutually perpendicular axes, therefore, $$\epsilon_\tau = \epsilon_x \sin \beta + \epsilon_y \cos \beta$$

and $$\epsilon_\beta = \epsilon_y \sin \beta - \epsilon_x \cos \beta$$

where $$\epsilon_x = X' - x'$$
$$\epsilon_y = Y' - y'$$

The error in the angle $\beta$ ($\epsilon_\beta'$) is not directly proportional to the quantity $\epsilon_\beta$.

$$\epsilon_\beta = \epsilon_\beta / d$$

where $\epsilon_\beta'$ = angular error,
$\epsilon_\beta$ = distance error along $\beta$ axis, and
$d$ = radial distance to point where error is measured.

The function $d$ is approximately proportional to the function $\tau$ of the $\tau$ servo. The approximation $$\epsilon_\beta' \simeq \frac{\epsilon_\beta}{1 + 10\tau}$$

was used.

Summary

The foregoing air traffic control system is entirely compatible with existing equipment, and is an adjunct thereto. It serves semi-automatically to provide an air traffic controller with the visual presentation of the computed future predicted path of the aircraft, as well as the present aircraft position. With this tool, the controller is able to trace the progress of an aircraft along the predicted path and issue all necessary commands to the aircraft pilot. Furthermore, by displaying only that portion of the path from present predicted position to the position a period of time hence, for example, two minutes, only a small portion of the PPI sweep time is shared, and many aircraft paths may be displayed, thus permitting a visual examination of a possible collision hazard. The utility of the invention is enhanced when used with the "Time Situation Display" described in the copending application of James A. Herndon, Ser. No. 277,146, now abandoned, assigned to the same assignee as this invention. In that system the periods for each aircraft between the times of beginning final approach and touchdown, defined as a non-passing zone, are displayed. If it appears from the Herndon display that two are more aircraft will be passing in the no-passing zone, the situation is correctable by the introduction in this system of a delay D in the paths of one or more of the aircraft.

While the described embodiment represents a workable system, not all the described components are preferred. For example, the mechanical switches and commutators are preferably replaced with known electronic equivalents, depending on economic and reliability factors. Further, while a specific preferred flight path has been illustrated in FIGURE 1, this may be modified to adapt to special needs. For example, a turn may be substituted for the delay line D, or other turns may be introduced into the path to account for individual airport traffic problems. Furthermore, while the system has been described in conection with an air traffic control system, it is equally usable for other purposes, for example, in automated factories for tracking the flow of materials from various points along assembly lines; for controlling the movement of ships or barges in high density ports; for controlling rail freight traffic; and many other purposes. Moreover, while the invention as described is time dependent, that is to say, all the path parameters are functions of time, the invention does not require such dependency but may be dependent on any other function; for example, distance.

Basically, the invention is distinguished from other systems in that it does not make a point-to-point computation but rather it iteratively simulates a flight from one point to a second point until the parameters are properly established. Once established, the simulated flight is repetitively flown and the voltages generated by the simulated flight are displayed at appropriate times. It is intended, therefore, that this invention be limited only by the scope of the appended claims as interpreted in the light of the prior art.

What is claimed is:

1. A system for computing and displaying a predicted paths of movement of a body from any known one position in space to any known second position in space, comprising:
    a simulator for generating a varying voltage representing the geographical coordinates of the predicted path of said body from said one position to said second position, said voltage being generated at an accelerated rate with respect to real time;
    a display device;
    means for displaying at least a portion of said predicted path on said display device, said portion commencing at present time; and
    means for simultaneously displaying the actual present position of said body on said display device whereby said actual present position may be visually compared with the predicted present position of said body to enable the visual determination of any difference therebetween.

2. The invention as defined in claim 1, wherein said simulator includes a heading resolver having an instantaneous voltage output representing an initial heading of said body, said outputs being generated at said accelerated rate;
    means responsive to a gating signal for changing the voltage output of said heading resolver at a selected rate.

3. The invention as defined in claim 2 and means for producing a plurality of gating signals for changing the voltage output of said heading resolver at a selected rate, said means comprising:
    adjustable means for establishing a plurality of discrete time analog voltages, each of which respectively represents the time of termination of each of said parameters;
    a fast time clock for repeatedly generating a sawtooth voltage at said accelerated rate, the instantaneous magnitude of said sawtooth voltage representing time; and
    means for comparing said sawtooth voltage with each of said discrete time analog voltages for generating a gating signal upon each ccurrence of coincidence between compared voltages.

4. The invention as defined in claim 2 and means for producing a plurality of gating signals for changing the voltage output of said heading resolver at a selected rate, said means comprising:
    adjustable means for establishing a plurality of time analog voltages, each representing the duration of a parameter of said predicted path;
    means for successively summing said voltages for producing a like plurality of discrete time voltages, each of which respectively represents the time of termination of each of said parameters;
    a fast time clock for repeatedly generating a sawtooth voltage at said accelerated rate, the instantaneous magnitude of said sawtooth voltage representing time; and means for comparing said sawtooth voltage with said discrete time voltages for generating a gating signal upon the occurrence of coincidence between said compared voltages.

5. The invention as defined in claim 2 wherein said means for changing the voltage output of said resolver includes means for selecting the direction of change.

6. The invention as defined in claim 2 wherein said resolver is an oscillator having rotatable sine and cosine wave outputs, the rotation of which is controllable.

7. In a system for computing and displaying the predicted path of a moving body on a known initial heading from one position in space to a second position in space on a known final heading, said positions being represented by actual positional voltages, said path including a plurality of programmed parameters, each of which is a function of time, the combination comprising:

adjustable means for establishing a plurality of discrete time analog voltages, each of which respectively represents the time of termination of each of said parameters;

a fast time clock for repeatedly generating a sawtooth voltage on an accelerated time base, the instantaneous magnitude of said sawtooth voltage representing time;

means for comparing said sawtooth voltage with each of said discrete time analog voltages for generating a control signal upon each occurrence of coincidence between compared voltages;

a predicted path simulator for generating instantaneous predicted positional output voltages representing the instantaneous predicted positions of said body from one of said positions in space to a predicted position corresponding to the other of said positions in space along said predicted path;

means responsive to said control signals for varying said output voltages of said simulator;

means for comparing the actual positional voltages representing the other of said positions in space with the predicted positional voltages representing said corresponding predicted position for generating a plurality of error voltages in response to the differences therebetween, said adjustable means being responsive to said error voltages to correct the parameters of said predicted path;

a display device; and means programmed at selected times during the generation of each sawtooth voltage for connecting said instantaneous predicted positional voltages from said simulator to said display device whereby said predicted positional voltages are displayed.

8. The invention as defined in claim 7 wherein said body is an aircraft and wherein said one position in space is the present position of said aircraft and wherein the second position in space is touchdown at a runway and wherein said aircraft is flying at a known initial velocity and at predicted future velocities and wherein said predicted path simulator includes means for resetting the instantaneous predicted positional output voltages to zero prior to the generation of said sawtooth voltage, said voltages at zero representing position at touchdown whereby said predicted path is generated in reverse from touchdown to present position.

9. The invention as defined in claim 8 wherein said simulator includes a rotatable heading resolver, said resolver having variable heading voltage outputs representing the instantaneous predicted headings of said aircraft, means for multiplying said heading voltage outputs by voltages representing said predicted velocities to produce velocity voltages representing the velocity components of said aircraft, and means for integrating said velocity voltages with respect to said accelerated time to produce said instantaneous predicted positional voltages.

10. The invention as defined in claim 8 wherein said aircraft is at a known initial altitude and at predicted altitudes during movement from present position to touchdown, means during the generation of each sawtooth voltage for generating instantaneous altitude voltages representing the instantaneous predicted altitude of said aircraft, and means responsive to said altitude voltages for compensating said velocity voltages for changes in predicted velocity due to changes in altitude.

11. The invention as defined in claim 8 wherein said aircraft is at a known initial altitude represented by an actual altitude voltage and at a predicted final altitude at a scheduled time prior to touchdown, said aircraft descending at a predetermined rate of descent, and an altitude flight simulator for generating a simulated altitude voltage representing the predicted instantaneous altitude of said aircraft from said final altitude to said initial altitude, said voltage increasing at said given time at a rate equal to said rate of descent on said accelerated time base;

altitude voltage comparison means for comparing said actual altitude voltage with said simulated altitude voltage and for generating an altitude signal at the instance of coincidence between said compared voltages, said altitude signal representing begin-descent time of said aircraft; and means responsive to said altitude signal for indicating said time.

12. The invention as defined in claim 8 wherein said aircraft is moving at a known initial velocity represented by an actual velocity voltage and at a predicted final velocity at a scheduled time prior to touchdown, said aircraft decelerating at a predetermined rate of deceleration, the combination comprising:

a velocity simulator for generating a simulated velocity voltage representing the predicted instantaneous velocity of said aircraft, said predicted velocity voltage having an initial value representing the final velocity of said aircraft and increasing at a rate equal to the rate of deceleration on said accelerated time base; and velocity comparison means for comparing said actual velocity voltage with said simulated velocity voltage and for generating a velocity signal at the instance of coincidence between said compared voltages, said velocity signal representing the begin-deceleration time of said aircraft; and means resopnsive to said velocity signal for indicating said time.

13. The invention as defined in claim 11 wherein said aircraft is moving at a known initial velocity represented by an actual velocity voltage and at a predicted final velocity at a scheduled time prior to touchdown, said aircraft decelerating at a predetermined rate of deceleration, the combination comprising:

a velocity simulator for generating a simulated velocity voltage representing the predicted instantaneous velocity of said aircraft, said predicted velocity voltage having an initial value representing the final velocity of said aircraft and increasing at a rate equal to the rate of deceleration on said accelerated time base;

velocity comparison means for comparing said actual velocity voltage with said simulated velocity of voltage and for generating a velocity signal at the instance of coincidence between said compared voltages, said velocity signal representing the begin-deceleration time of said aircraft; and means responsive to said velocity signal for indicating said time.

14. In a system for computing and displaying the predicted path of a moving body on a known initial heading from one position in space to a second position in space on a known final heading, said positions being represented by actual positional voltages, said path including a plurality of programmed parameters, each of which is a function of time, the combination comprising:

adjustable means for establishing a plurality of analog voltages, each representing a dimension of a respective one of said parameters;

means for successively summing said analog voltages for producing a like plurality of discrete voltages;

a generator for repeatedly generating a sawtooth voltage on an accelerated time base, the instantaneous magnitude of said sawtooth voltage representing said dimension;

means for comparing said sawtooth voltage with said discrete voltages for generating a control signal upon the occurrence of coincidence between said compared voltages;

a predicted path simulator for generating instantaneous predicted positional output voltages representing the instantaneous predicted positions of said body from one of said actual positions in space to a predicted position corresponding to the other of said positions in space along said predicted path;

means responsive to said control signals for varying the output of said simulator;

means for comparing actual positional voltages representing the other of said positions in space with predicted positional voltages representing said corresponding predicted position for generating a plurality of error voltages in response to the difference therebetween, said adjustable means being responsive to said error voltages to correct the parameters of said predicted path;

a display device; and means programmed at selected times during the generation of each sawtooth voltage for connecting said instantaneous predicted positional voltages from said simulator to said display device whereby said predicted positional voltages are displayed.

15. The invention as defined in claim 14 wherein said dimension is time and wherein said body is an aircraft and wherein said one position in space is the present position of said aircraft and wherein the second position in space is touchdown at a runway and wherein said aircraft is flying at a known initial velocity and at predicted future velocities and wherein said predicted path simulator includes means for resetting the instantaneous predicted positional output voltages to zero prior to the generation of said sawtooth voltage, said voltages at zero representing position at touchdown whereby said predicted path is generated in reverse from touchdown to present position.

16. The invention as defined in claim 14 wherein said simulator includes a rotatable heading resolver, said resolver having variable heading voltage outputs representing the instantaneous predicted headings of said aircraft, means for multiplying said heading voltage outputs by voltages representing said predicted velocities to produce velocity voltages representing the velocity components of said aircraft, and means for integrating said velocity voltages with respect to said accelerated time to produce said instantaneous predicted positional voltages.

17. The invention as defined in claim 16 wherein said aircraft is at a known initial altitude and at predicted altitudes during movement from present position to touchdown, means during the generation of each sawtooth voltage for generating instantaneous altitude voltages representing the instantaneous predicted altitude of said aircraft, and means responsive to said altitude voltages for compensating said velocity voltages for changes in predicted velocity due to changes in altitude.

18. An air traffic control system for computing and displaying the predicted flight path of an aircraft from its present position in space to touchdown at a runway, said aircraft flying on a known initial heading with respect to said runway, at a known initial velocity, and at predicted velocities at determined future predicted times prior to touchdown, said path including a plurality of programmed parameters, each being of a predetermined time duration, the combination comprising:

means for establishing a plurality of voltages, each proportional to one of said time durations;

means for successively summing said voltages to derive a plurality of time voltages, each representing the time of the termination of each of said time durations;

a fast time clock for repetitively generating a sawtooth voltage on an accelerated time base, the magnitude of said voltage being proportional to time;

means for comparing said sawtooth voltage with said time voltages and for controlling the generation of a plurality of signal gates upon each successive occurrence of coincidence;

a heading resolver having variable heading voltage outputs which are a function of the predicted heading of said aircraft;

means for setting said heading resolver at zero degrees with respect to the runway upon the termination of each sawtooth voltage; and means responsive to each generated signal gate for rotating said heading resolver at a selected angular rate and direction for the duration of each of said signal gates.

19. The invention as described in claim 18 wherein means are provided for selecting the direction of rotation of said heading resolver.

20. The invention as defined in claim 18 wherein said heading resolver comprises a double integrator reversible sine wave oscillator having first and second output voltages which are sine and cosine functions, respectively, of the instantaneous predicted heading of said aircraft with respect to the runway.

21. The invention as defined in claim 20 and means for multiplying said first and second voltages with a voltage proportional to the instantaneous predicted velocity of said aircraft;

means to produce first and second velocity components of said first and second voltages;

means for integrating said first and second velocity components with respect to said accelerated time to produce positional components of said latter voltages;

a two-dimensional display device; and means at selected times during the occurrence of each sawtooth voltage for driving said display device, whereby said positional components are displayed, said display representing the predicted path of said aircraft generated in reverse from point of touchdown to initial position.

22. The invention as defined in claim 18 and a real time clock for generating a second sawtooth voltage having a magnitude which is said function of time and having a duration which represents real time;

means for continuously subtracting said second sawtooth voltage from the summation of said time voltages, said means for driving said display device being rendered inoperative at a time represented by a difference voltage equal to the subtraction of said second sawtooth voltage from said summation, whereby said path is displayed from the instantaneous predicted position of the aircraft.

23. The combination comprising:

a heading resolver having a heading output which rotates as a function of applied gate signals, said resolver comprising an oscillator having sine and cosine voltage outputs representing components of heading with respect to an initial heading from an initial position;

adjustable means for generating a plurality of discrete time analog voltages, the magnitude of each representing the termination in real time of the movement of a body at determined velocities along one parameter of a path, said path having a plurality of parameters;

a fast time clock for repetitively generating a sawtooth voltage at an accelerated rate with respect to real time, the instantaneous magnitude of said sawtooth voltage representing real time;

means for resetting said heading resolver to said initial heading prior to each generation of said sawtooth voltage;

means for comparing each of said discrete time analog voltages with said sawtooth voltage duringe the generation of said sawtooth voltage and for generating gate signals upon the occurrence of each instance of coincidence between said sawtooth voltage and each of said discrete voltages;

means for applying said gate signals to said heading resolver to rotate said heading output;

means generating instantaneous variable velocity voltages representing the determined velocities of said body;

means successively multiplying said sine and cosine output voltages by said instantaneous velocity voltages during successive generations of said sawtooth voltages to successively generate instantaneous velocity components of said heading voltage components for said body;

means successively integrating said velocity components with respect to time at said accelerated rate to generate instantaneous positional voltage components;

a two-dimensional display device; and means connecting said instantaneous positional voltage components to said display device at selected times during the generation of each successive sawtooth voltage.

24. The invention as defined in claim 23, and means for controlling the direction of rotation of said heading resolver.

25. The invention as defined in claim 23, and a real time clock for generating a second sawtooth voltage on a real time base, the magnitude of said second sawtooth voltage representing real elapsed time measured from the initial position of said body;

means including said comparator means for successively comparing said first-mentioned sawtooth voltage with said second sawtooth voltage and for generating successive display control gates upon the occurrence of coincidence between said compared sawtooth voltages, said means connecting said instantaneous positional voltage components to said display device being responsive to said display control gates.

26. The invention as defined in claim 25, and means for generating a display time voltage representing time of display;

means including said comparator means for successively summing said display time voltage and said second sawtooth voltage;

means including said comparator means for successively comparing said summation with said first-mentioned sawtooth voltage and for generating a display termination gate upon the occurrence of coincidence between each of said compared voltages; and means responsive to said display termination control gates for disconnecting said instantaneous positional voltages from said display device.

27. The invention as defined in claim 26 wherein said display device is a cathode-ray oscilloscope having first and second beam-deflecting means, and wherein said instantaneous positional voltage components are connected to respective ones of said beam-deflecting means.

28. The invention as defined in claim 23 wherein additional adjustable means are provided for generating additional pluralities of discrete time analog voltages, each of said additional pluralities of discrete time analog voltages representing the termination of a parameter in a path of another body from an initial position to a second position; and comparator means for successively comparing each of said pluralities of discrete time analog voltages with successively generated sawtooth voltages, whereby said heading outputs successively represent the heading of a plurality of bodies.

29. The invention as defined in claim 28, and a plurality of additional real time clocks for generating a plurality of second sawtooth voltages on a real time base, the magnitude of each of each of said second sawtooth voltages representing real elasped time measured from the initial position of each of a respective plurality of said bodies; and means including said comparator means for successively comparing said first-mentioned sawtooth voltage with each of said second sawtooth voltages and for generating successive display control gates upon the occurrence of coincidence between said compared sawtooth voltages, said means connecting said instantaneous positional voltage components to said display device being responsive to said display control gates.

30. The invention as defined in claim 29, and means for generating a display time voltage representing time of display;

means including said comparator means for successively summing said display time voltage and each of said second sawtooth voltages;

means including said comparator means for successively comparing each of said summations with said first-mentioned sawtooth voltage for generating a display termination gate upon the occurrence of coincidence between each of said compared voltages; and means responsive to said display termination control gates for disconnecting said instantaneous positional voltages from said display device.

References Cited

UNITED STATES PATENTS

| | | | |
|---|---|---|---|
| 2,844,817 | 7/1958 | Green | 235—150.23 X |
| 3,028,078 | 4/1962 | De George et al. | 235—150.27 X |
| 3,052,427 | 9/1962 | Match et al. | 244—77 |
| 3,096,433 | 7/1963 | Daspit et al. | 235—150.23 |
| 3,143,646 | 8/1964 | Tasker et al. | 235—189 X |
| 3,159,738 | 12/1964 | James et al. | 235—150.23 |
| 3,177,348 | 3/1965 | Daniloff | 235—150.23 |
| 3,180,976 | 4/1965 | Robinson | 235—189 |

MALCOLM A. MORRISON, *Primary Examiner.*

MARTIN P. HARTMAN, *Examiner.*

I. KESCHNER, *Assistant Examiner.*

UNITED STATES PATENT OFFICE
CERTIFICATE OF CORRECTION

Patent No. 3,330,944                        July 11, 1967

John A. Inderhees

It is hereby certified that error appears in the above numbered patent requiring correction and that the said Letters Patent should read as corrected below.

Column 2, line 13, for "further" read -- future --; column 3, line 51, for "remander" read -- remainder --; line 64, after "onto" insert -- the --; column 5, line 70, for "later" read -- latter --; column 6, line 22, for "subtraced" read -- subtracted --; column 7, line 18, for "coincidetnce" read -- coincidence --; line 29, for "at" read -- a --; column 12, line 11, for "th" read -- the --; line 72, for "integration" read -- integrator --; column 13, line 17, for "interter" read -- inverter --; column 15, line 56, for "non-passing" read -- no-passing --; line 57, for "are" read -- or --; line 69, for "dalay;" read -- delay --; line 72, for "conection" read -- connection --; column 16, line 19, for "a" read -- the --; line 20, for "paths" read -- path --; column 18, line 48, for "resopnsive" read -- responsive --; line 63, strike out "of"; column 21, line 11, for "duringe" read -- during --; column 22, lines 16 and 17, for "heading", second occurrence, read -- headings --; line 21, strike out "of each", second occurrence.

Signed and sealed this 18th day of June 1968.

(SEAL)
Attest:

EDWARD M. FLETCHER, JR.                   EDWARD J. BRENNER
Attesting Officer                         Commissioner of Patents